(12) United States Patent
Martin et al.

(10) Patent No.: US 7,875,665 B2
(45) Date of Patent: Jan. 25, 2011

(54) SELF-DISPERSING WAXES AS POLYMER SUSPENSION AIDS

(75) Inventors: Thomas J. Martin, Mansfield, TX (US); William P. Cottom, Mounds, OK (US)

(73) Assignee: Baker Hughes Incorporated, Houston, TX (US)

( * ) Notice: Subject to any disclaimer, the term of this patent is extended or adjusted under 35 U.S.C. 154(b) by 448 days.

(21) Appl. No.: 12/116,340

(22) Filed: May 7, 2008

(65) Prior Publication Data

US 2008/0242796 A1    Oct. 2, 2008

Related U.S. Application Data

(62) Division of application No. 11/406,778, filed on Apr. 19, 2006, now Pat. No. 7,388,046.

(51) Int. Cl.
*C08K 5/06* (2006.01)
*B05D 5/08* (2006.01)
*C08L 23/00* (2006.01)

(52) U.S. Cl. .............. 524/379; 524/386; 524/570; 524/275; 524/276; 524/277; 523/175

(58) Field of Classification Search .......... 524/379, 524/386, 275, 276, 277, 270, 570; 523/175
See application file for complete search history.

(56) References Cited

U.S. PATENT DOCUMENTS

| | | | |
|---|---|---|---|
| 4,084,993 A | 4/1978 | Cook | |
| 4,384,616 A | 5/1983 | Dellinger | |
| 4,584,244 A | 4/1986 | Fenton | |
| 4,720,397 A | 1/1988 | O'Mara et al. | |
| 4,789,383 A | 12/1988 | O'Mara et al. | |
| 4,826,728 A | 5/1989 | O'Mara et al. | |
| 4,837,249 A | 6/1989 | O'Mara et al. | |
| 5,165,440 A | 11/1992 | Johnston | |
| 5,165,441 A | 11/1992 | Mitchell | |
| 5,244,937 A | 9/1993 | Lee et al. | |
| 5,376,697 A | 12/1994 | Johnston et al. | |
| 5,449,732 A | 9/1995 | Smith et al. | |
| 5,504,131 A | 4/1996 | Smith et al. | |
| 5,504,132 A | 4/1996 | Smith et al. | |
| 5,539,044 A | 7/1996 | Dindi et al. | |
| 5,582,250 A | 12/1996 | Constien | |
| 5,858,927 A | 1/1999 | Poelker et al. | |
| 5,961,804 A | 10/1999 | Jacobson et al. | |
| 6,039,932 A | 3/2000 | Govind et al. | |
| 6,100,221 A | 8/2000 | Poelker et al. | |
| 6,126,872 A | 10/2000 | Kommareddi et al. | |
| 6,160,036 A | 12/2000 | Kommareddi et al. | |
| 6,172,151 B1 | 1/2001 | Johnston et al. | |
| 6,268,103 B1 | 7/2001 | Hopper et al. | |
| 6,399,676 B1 | 6/2002 | Labude et al. | |
| 6,576,732 B1 | 6/2003 | Milligan et al. | |
| 6,596,832 B2 | 7/2003 | Johnston et al. | |
| 6,649,670 B1 | 11/2003 | Harris et al. | |
| 6,765,053 B2 | 7/2004 | Labude et al. | |
| 6,939,902 B2 | 9/2005 | Smith et al. | |
| 6,989,357 B2 | 1/2006 | Eaton et al. | |
| 7,256,224 B2 | 8/2007 | Martin et al. | |
| 2002/0065352 A1 | 5/2002 | Johnston et al. | |
| 2003/0013783 A1 | 1/2003 | Kommareddi et al. | |
| 2003/0065054 A1 | 4/2003 | Smith et al. | |
| 2003/0065055 A1 | 4/2003 | Johnston et al. | |
| 2003/0109397 A1 | 6/2003 | Aouad et al. | |
| 2003/0187123 A1 | 10/2003 | Labude et al. | |
| 2004/0110645 A1 | 6/2004 | Campbell | |
| 2006/0058437 A1* | 3/2006 | Martin et al. | 524/275 |

FOREIGN PATENT DOCUMENTS

WO    2005054958 A1    6/2005

OTHER PUBLICATIONS

Baker Petrolite Polymers Division, Unithox 520 Ethoxylate Material Safety Data Sheet, pp. 1-9, Dec. 7, 2004.
T. Dujmovich, et al., "Drag Reducers Improve Throughput, Cut Costs," Offshore, Dec. 2005, vol. 65, Issue 12, available at http://www.offshore-mag.com/Articles/Article_Display.cfm?Article_ID=243606.

* cited by examiner

*Primary Examiner*—Michael M Bernshteyn
(74) *Attorney, Agent, or Firm*—Mossman Kumar & Tyler PC

(57) ABSTRACT

Polymer particles of ultrahigh molecular weight poly(alpha-olefins) may be made stable toward agglomeration by suspension within a co-suspension of self-dispersing waxes. This combination prevents polymer agglomeration over time while maintaining good flowability properties. Such materials, ultimately used as pipeline additives to reduce the fluid drag and increase the volumetric throughput, may be shipped and stored for extended periods of time without irreversible loss of the suspension stability.

17 Claims, No Drawings

SELF-DISPERSING WAXES AS POLYMER SUSPENSION AIDS

CROSS-REFERENCE TO RELATED APPLICATION

This application is a divisional of U.S. patent application Ser. No. 11/406,778 filed Apr. 19, 2006.

TECHNICAL FIELD

The invention relates to processes for producing suspensions of polymeric drag reducing agents, and most particularly to processes for providing suspensions of polymeric drag reducing agents in a form that is stable during storage, handling and shipping using self-dispersing waxes

TECHNICAL BACKGROUND

The use of polymers, particularly poly(alpha-olefins) or copolymers thereof, to reduce the drag of a hydrocarbon flowing through a conduit, and hence the energy requirements for such fluid hydrocarbon transportation, is well known. These drag reducing agents or DRAs have taken various forms in the past, including slurries or dispersions of ground polymers to form free-flowing and pumpable mixtures in liquid media. A problem generally experienced with simply grinding the polyalpha-olefins (PAOs) is that the particles will "cold flow" or stick together after the passage of time, thus making it impossible to place the PAO in the hydrocarbon where drag is to be reduced, in a form of suitable surface area, and thus particle size, that will dissolve or otherwise mix with the hydrocarbon in an efficient manner. Further, the grinding process or mechanical work employed in size reduction tends to degrade the polymer, thereby reducing the drag reduction efficiency of the polymer.

In general, the DRA polymer may be obtained via solution polymerization of an alpha olefin monomer, or a mixture of olefinic monomers, or from bulk polymerization (i.e., without solvent) of such monomer(s). The DRA polymer may then be subsequently made into particulate form by cutting, chopping, granulating, grinding and/or other size reduction, at cryogenic or ambient temperatures. Alternatively, it may be precipitated from solution by addition of a non-solvent component. Mixtures of polymer solids from both sources may be used.

Once the polymer DRA is prepared and reduced to appropriate particulate form, it may be incorporated with a liquid carrier to form a slurry. In some embodiments the liquid carrier is a non-solvent for the polymer DRA and its selection may vary widely. A problem that is often encountered, however, is that there is a natural tendency for such slurries to settle over time, or to separate or agglomerate such that the slurries no longer maintain a free-flowing and pumpable nature.

Some ways of addressing this problem have been to include (1) a partitioning agent, (2) a wetting agent, and/or (3) a rheology modifier in the slurry together with the carrier liquid and the DRA polymer particles. These three components, which are frequently all included, may be referred to generally as "suspension aids". The purpose of the partitioning agent is to physically hold the polymer DRA particle surfaces apart. The purpose of the wetting agent is to wet the polymer DRA surface, and the purpose of the rheology modifier is to increase the viscosity of the liquid carrier to slow down polymer DRA particle settling or rising. In some cases a single ingredient may serve more than one purpose within the suspension aid package. In one non-limiting embodiment herein a "suspendsion" is defined as a stable slurry.

The liquid carrier is, in some embodiments, a non-solvent for the polymer DRA and may vary widely. Selections for this component may include both aqueous and non-aqueous liquids, including, for example, water and aqueous solutions of various pH and ionic strength; alcohols and fatty alcohols; glycols and diols; glycol ethers; glycol esters; mixtures of these; and the like.

The wetting agent is often included in such formulations, particularly for aqueous carrier liquids. Without a wetting agent the liquid carrier would quickly drain away from a non-wetted polymer surface. This would result in a highly separated suspension. Fatty acid waxes have been used as wetting agents, as well as commercially available surfactants, including, but not necessarily TWEEN™, SPAN™, BRIJ™, and MYRIJ™. These surfactants, which are generally sorbitan esters, ethoxylated sorbitan esters, alcohol ethoxylates and polyoxyethylene fatty acids, are available from Uniqema. Other surfactants that have been or may be employed include, but are not limited to, TERGITOL™ and TRITON™ surfactants available from Dow Chemical Company, IGEPAL™ ethoxylated alkylphenol surfactants available from Rhodia HPCII, and the like.

Inclusion of a partitioning agent may also be generally desirable in these slurries. This is because polymer DRAs are often in the form of soft, tacky particles that will agglomerate, or cold flow, when their unaltered surfaces come into contact with one another. Common partitioning agents employed may include, but are not necessarily limited to, fatty acid waxes, stearic acid and stearate salts (e.g. alkali earth metal stearates such as calcium stearate and magnesium stearate), stearamides, polyolefin homopolymers and copolymers of various densities; oxidized polyethylene; polystyrene and copolymers; carbon black and graphites; micronized polyphenylene sulfide (PPS), polyphenylene oxide (PPO), polyamides, polyethylene terephthalate (PET), polybutylene terephthalate (PBT), polyvinyl chloride (PVC); precipitated and fumed silicas; natural and synthetic clays; organo-clays; aluminum oxides; talc; boric acid; polyanhydride polymers; sterically hindered alkyl phenol oxidants; magnesium, calcium and barium phosphates, sulfates, carbonates and oxides; mixtures thereof; and the like.

It should be noted, however, that many partitioning agents require heating to reach maximum effectiveness in a formulation. But heating a process stream is often economically disadvantageous in commercial production. Often the proportion of partitioning agent levels in a final DRA formulation may be as high as 10% to react effectiveness. Since the partitioning agent is a non-active component providing no drag reduction and used only for suspension stability, the more of it that is required in the formulation, the higher the cost the product will be without a commensurate increase in performance.

A rheology modifying agent may, in some embodiments, also be added to minimize settling of the polymer DRA slurry. By adding the modifying agent to the liquid carrier, settling or rising of the DRA polymer may be hindered or prevented. Common rheology modifying agents include, but are not necessarily limited to, polysaccharides and natural gums, cellulosics, natural or modified starches, synthetic polymers such as polyvinyl alcohol (PVA), polyethylene oxide (PEO), polyethylene glycol (PEG), polyvinyl pyrrolidone (PVP), and the like. However, these materials generally have no particulate properties that would permit them to serve as a partitioning aid. Rheology modifiers for aqueous suspensions typically require sufficient hydration in solution so that hydrogen bonding between the polymer chains of the rheology modifiers provides for weak, temporary inter-chain bonding. This interaction gives rise to a viscosity increase within the aqueous solution. The use of glycols and other freeze protectants as components in aqueous carriers typically interfere with the rheology modifier and disable its function and usefulness.

Another practice to enhance suspension stability is to match the suspended particle density to the carrier density by using a combination of carrier components in a proportion such that the overall carrier mixture density equals the suspended particle density. A drawback of this practice is that there are a limited number of carriers available at an economical cost that have both the proper densities and the necessary hydrophobic/hydrophilic properties.

It may be appreciated that considerable resources have been spent on both chemical and physical techniques for easily and effectively delivering drag reducing agents to the fluid that will have its drag or friction reduced. Yet none of these prior methods has proven entirely satisfactory. Thus, it would be desirable if a drag reducing agent could be developed which is stable during storage, transportation and handling, that is, does not separate out the DRA particles. In view of the above, there is still a need in the art to discover ways to produce stabilized polymer DRA slurries that are convenient and economical and which do not unacceptably suffer from the drawbacks discussed hereinabove. In non-limiting examples, it would be helpful to develop a method to produce stable DRA products that avoid the application of additional heat and/or avoid grinding of the suspension aid per se.

SUMMARY

There may be provided, in one non-restrictive form, a polymer suspension that includes a carrier liquid and a self-dispersing wax, where the self-dispersing wax involves a surfactant property that is provided by the self-dispersing wax itself or by a separate surfactant. The polymer suspension also includes suspended polymer particles, where optionally these particles may be DRAs.

In an alternate non-limiting embodiment of the invention, there is provided a method for forming a polymer suspension involving combining in any order: a carrier liquid, a self-dispersing wax, and polymer particles. Upon mixing, the self-dispersing wax spontaneously forms a stable suspension of solid wax particles in the carrier liquid in the absence of applying added heat or grinding to the wax. The polymer particles are suspended in the stable suspension.

There is also provided in a non-restrictive version a method for forming a polymer suspension that involves introducing a self-dispersing wax into a carrier liquid, where upon mixing the self-dispersing wax spontaneously forms a stable suspension of solid wax particles in the carrier liquid. This stable suspension is formed in the absence of applying added heat or grinding to the wax. Polymer particles may then be introduced into and suspended in the stable suspension to form a stable DRA suspension product.

In another non-limiting embodiment of the invention, there is offered a hydrocarbon-containing stream having reduced drag that includes a hydrocarbon and the polymer suspensions described above.

DETAILED DESCRIPTION

It has been discovered that a polymer solution, including a DRA polymer solution, may be hindered and even prevented from separating and/or agglomerating by the use of self-dispersing waxes. The self-dispersing wax, which may be characterized in one non-limiting embodiment as a soft, heat sensitive hydrocarbon or hydrocarbon derivative that is substantially insoluble in water, may vary widely. By "self-dispersing" herein it is meant that the self-dispersing wax spontaneously forms a finely divided, stable suspension of solid wax particles when added to water, aqueous solutions, and carrier liquids that are a non-solvent for the polymer. Water or other non-solvent may be understood as a component (or the only component) of the carrier liquid in the final polymer (e.g. DRA) suspension. Further herein, "spontaneous" is defined as "occurring without external aid", such as added heating to or grinding of the self-dispersing wax. It will be appreciated that this definition of spontaneous does not exclude incidental heating of the wax by the carrier fluid that may be, but is not limited to be, warmer than the wax, nor does this definition exclude grinding or other size reduction of the polymer (e.g. DRA) itself in a separate step, process or procedure.

It will be appreciated that the initial form of the wax material may be a solid, paste or a concentrate, and may contain other components including, but not necessarily limited to, stabilizers and additives including, but not necessarily limited to, surfactants, antioxidants, biocides, encapsulants, and the like. In one non-limiting embodiment, the density of the self-dispersing wax may vary, but may be within ±5% of the density of the carrier liquid, and in another non-restrictive version within ±1% thereof. Thus, in this sense the self-dispersing waxes may be considered to be "density matched" with the carrier fluid.

The self-dispersing wax may be, by itself in water or other carrier liquid, stabilized toward flocculation and agglomeration by a surface-adsorbed layer of surfactant, where the surfactant may be molecularly the same material as the bulk solid wax, or a distinctly separate molecular species from the wax. Most self-dispersing waxes are of the latter form, but some, such as high molecular weight alcohol ethoxylates, are at least partially soluble in water such that the majority of the ethoxylate remains as a dispersed solid, while a small fraction is dispersed in the water and acts as a surfactant.

Stated another way, the self-dispersing wax includes a surfactant property where the self-dispersing wax itself has a surfactant characteristic or property, and/or the self-dispersing wax contains or includes a separate surfactant.

The surprising, improved stability of the polymer suspension might be explained as follows, although it will be appreciated that the compositions and methods herein are not intended to be limited by any explanation, mechanism or theory. The wax dispersion in water or other carrier liquid is thought to be stabilized by a layer of surfactant, with excess surfactant being dissolved in the water or aqueous phase present. When the polymer, such as a DRA polymer, is added, the new, untreated surfaces accept a significant portion of the surfactant from the wax surface and the water or aqueous phase. This depletion of the surface of the wax, on a per surface area basis, may destabilize the stability of the particles such that the wax and the (DRA) polymer generally associate or loosely agglomerate or reversibly agglomerate or insecurely aggregate to a degree, providing both partitioning of the polymer particles (DRA) and surface wetting. The dispersed wax component is believed to act not only as a partitioning agent to keep tacky polymer particles separated, but as a wetting agent and/or rheology modifier, in one non-limiting explanation.

It should also be understood that the self-dispersing wax is not adhered, attached, affixed, or permanently connected to the surfaces of the suspended polymer particles. In non-limiting instances, while the self-dispersing wax coats the polymer particle surfaces, it is not covalently bonded thereto, and the self-dispersing wax layer or coating could be easily removed if desired, such as by washing. Of course, in the practice of the method and compositions herein it is desirable for the wax to contact and coat the polymer particle surfaces, but this is to be understood as different from the wax being adhered, attached, affixed or otherwise part of the polymer particle surfaces.

Advantages of the compositions and methods herein include, but are not necessarily limited to, the facts that no grinding or addition of heat to the self-dispersing wax is necessary to cause the wax to be effective. Another potential advantage is that the self-dispersing wax may be used at a low level, amount or proportion. Yet another possible advantage includes the fact that the self-dispersing wax may function as a partitioning aid, a wetting agent, and/or a rheology modifier, or all three.

In general, the polymer suspensions herein include a carrier liquid, the self-dispersing wax, and suspended polymer particles. As described above, the self-dispersing wax may have a density similar to the carrier liquid density, may contain a surfactant, or may itself be a surfactant, and may spontaneously disperse as fine particles. By "fine particles" or "finely divided particles" is meant particles of sufficiently small size as to permit the suspension to readily flow, be pumpable and/or be readily introduced into a flowing hydrocarbon and dissolved therein without extraordinary mixing, agitation or equipment. Some mixing and/or agitation, even at high shear, is expected and acceptable.

The non-solvent (carrier liquid) in some non-restrictive embodiments of the invention may include, but is not necessarily limited to, non-hydrocarbon components such as water or aqueous solutions of various pH and ionic strengths, alcohols and fatty alcohols, glycols and diols, glycol ethers, glycol esters, or mixtures of these. In one non-limiting embodiment, the carrier liquid is water together with one of the other components mentioned. Butyl cellosolve, hexanol, water, and hexylene glycol are useful in some embodiments of the invention, and hexylene glycol is particularly helpful in some applications. The bulk or majority of the carrier fluid may be any of the above materials, or alternatively a blend of like materials, such as a blend of one or more alcohols with one or more glycols and the like. In some non-restrictive versions, the carrier fluid may also optionally have minor amounts of dissolved components including, but not necessarily limited to, acids, bases, salts, polymeric thickeners, biocides, etc., which are not uncommon components for DRA slurries.

With respect to the self-dispersing wax, in one non-restrictive version the wax may be at least one alcohol ethoxylate having an alcohol moiety with at least 12 carbon atoms and having from 1 to 10 ethoxy moieties or units. Alternatively, the self-dispersing wax may include at least one additional compound that is an alcohol having at least 12 carbon atoms and/or saturated or unsaturated hydrocarbons having at least 12 carbon atoms, and mixtures thereof. In another non-limiting embodiment, where the self-dispersing wax has a non-ionic surfactant component, the non-ionic surfactant component may have a hydrophilic-lipophilic balance (HLB) of less than about 6, and alternatively, a HLB of less than about 5.

Other self-dispersing waxes include, but are not necessarily limited to, alkali earth metal stearates (e.g. calcium stearate, magnesium stearate), a polyolefin separate and different from the suspended polymer particles, naturally-occurring waxes, and combinations thereof. Alkali earth metal stearates are known as suspension aids, particularly in powdered forms, but are not known as self-dispersing waxes per se in the stable suspensions herein. Specific, but non-limiting examples of suitable self-dispersing waxes, which may include known or proprietary surfactants, include CAL-SAN® 50 (available from BASF Corporation); SYNPRO® calcium stearate 50BRE (available from Ferro Corporation); AQUACER® 539, CERCOL® 601, AQUACER® 531, AQUACER 532, AQUAMAT® 208 (all available from Byk Chemie GmbH); MICHEM® Emulsion 98040M1, MICHEM Emulsion 48040M1, MICHEM Lube 162, MICHEM Emulsion 39235, MICHEM Guard 25 (all available from Michelman, Inc.); and UNITHOX® 420, UNITHOX 520 and UNITHOX 720 ethoxylates (all available from Baker Petrolite). UNITHOX 420 and UNITHOX 520 are materials that contain 10-30% of non-ethoxylated wax, which may be described as ethylene homopolymer or a high molecular weight alcohol. In one non-limiting embodiment of the invention, the self-dispersing waxes suitably employed herein are "micronized", that is, have dimensions when dispersed in a stable suspension on the order of a few tens or hundreds of microns. Suitable sizes for the micronized self-dispersing waxes may range between a lower limit of about 1 microns and an upper limit of about 200 microns; alternatively, they may have a lower limit of about 5 microns and an upper limit of about of 50 microns.

In one non-limiting embodiment. It is occasionally helpful in some non-limiting embodiments, but not generally necessary, to add the wax to the water as a first step in the process. Some wax types, especially the distinct wax/surfactants such as the MICHEM materials, etc., may be added to the DRA polymer/water mixture after the two are mixed.

Suitable surfactants to be used with the self-dispersing waxes herein include, but are not necessarily limited to, those surfactants mentioned in the Background herein, as well as other alkoxylated, particularly ethoxylated compounds, such as ethoxylated and/or propoxylated alcohols and/or alkyl phenols; amines and quaternary ammonium salts; alcohol sulfates and phosphates; alcohol ether sulfates and phosphates; betaine derivatives; fatty alcohols and fatty acids; stearates and stearamides; oil bean, protein, tallow and vegetable oil derivatives; salts of these; and mixtures of these.

In an alternative, non-limiting embodiment of the compositions and methods herein, the surfactant property of the self-dispersing wax, or the inclusion of a surfactant in with the wax may not be as important a feature or characteristic as the fact that the wax is self-dispersing as described herein.

The concentration of self-dispersing wax solids may range from about 0.01% to about 30% by weight, based on the entire polymer suspension, and in another non-limiting embodiment may have a lower limit of about 0.1 wt % to about 8 wt % as an upper threshold. In another non-limiting embodiment.

The compositions of matter where the polymer particles are a DRA polymer are useful as pipeline additives to reduce the fluid drag and increase the volumetric transfer (throughput) rate of the transported stream. This additive is typically metered into the flowing liquid within the pipeline over a period of time, e.g., days, weeks, or months, which is similar to the timeframe for storage and transportation to the point of use. Therefore, it is desirable for this material to be fluid to allow for easy transfer and injection, but not separate and become macroscopically inhomogeneous (e.g., settling, floating, or otherwise destabilize, possibly accompanied by agglomeration to form chunks that plug filters or will not flow through pipes). Ideally, a homogeneous suspension of fine particles with low viscosity is desired.

The DRA polymer, used in many types of crude oil and in refined products such as gasoline and diesel fuels, is an ultra-high molecular weight polyalpha-olefin polymer or copolymer. Such materials, formed by various methods as granules or particulates during manufacture, tend to "cold flow" together to produce irreversible agglomerates, unless they are suspended in carrier liquids, herein with the assistance of the self-dispersing waxes.

To be effective upon injection into the pipeline, the drag reducer polymer particle must dissolve quickly, given that a polymeric drag reducer is effective only when fully dissolved as a large, random polymer coil in solution. Therefore, the self-dispersing wax must not inhibit dissolution while performing as a suspension aid and partitioning agent. Additionally, shear degradation must be avoided, which is another reason, in addition to low viscosity, that transferring products as slurries is preferred. Transferring polymer solutions, or gels, such as through a high shear pump, will degrade the polymer over time and lower its effectiveness at drag reduction.

Polyalpha-olefins, which in one non-limiting embodiment are suitable DRAs herein, are polymerized from the monomers or comonomers by conventional techniques and will have molecular weights above 10 million. Suitable specific DRA polymers include, but are not limited to, FLO® XL® and FLO® MX drag reducers are available from Baker Petrolite. Solution polymerization followed by precipitation is the process used for FLO XL drag reducer production. The intermediate FLO XL cake, formed by filtration of the precipitated polymer, is one source of polymer for the methods and compositions herein. Bulk polymerization followed by granulation and grinding is a process for FLO MX production, which may also be used in the suspensions and methods herein.

In one non-limiting embodiment of this invention, the granulation and/or grinding for producing particulate polymer DRA may be conducted at cryogenic or non-cryogenic temperatures. For the purposes of this invention, cryogenic temperature is defined as the glass transition temperature ($T_g$) of the particular polymer having its size reduced or being ground, or below that temperature. It will be appreciated that $T_g$ will vary with the specific polymer being ground. Typically, $T_g$ ranges between about −10° C. and about −100° C. (about 14° F. and about −148° F.), in one non-limiting embodiment. As noted, in another non-limiting embodiment of the invention, the grinding for producing particulate polymer drag reducing agent is conducted at ambient temperature, although the temperature will rise during grinding, of course. Poly(alpha-olefin) is one preferred polymer in one non-limiting embodiment of the invention. In one non-restrictive embodiment of the invention, the polymer may have its size reduced in one step, or may have its size reduced in multiple steps or stages. Such ground or granulated polymer particles may have a lower limit of about 1 μm and an upper limit of about 60 mm; alternatively, they may have a lower limit of about 50 μm and an upper limit of about of about 12 mm. It is permissible in an alternate embodiment for the granulated polymer to have an anti-agglomeration agent thereon, although it is expected that the methods and compositions described herein may be successfully practiced in the absence of any anti-agglomeration agent other than the self-dispersing wax.

Within the context of this invention, the term "granulate" refers to any size reduction process that produces a product that is relatively larger than that produced by grinding or homogenizing. Further within the context of this invention, "grinding" refers to a size reduction process that gives a product relatively smaller than that produced by "granulation". "Grinding" may refer to any milling, pulverization, attrition, or other size reduction that results in particulate polymer drag reducing agents of the size and type that are the goal of the invention.

While grinding mills, particularly attrition mills such as Pallmann attrition mills, Munson centrifugal impact mills, Palmer mechanical reclamation mills, etc. may be used in various non-limiting embodiments of the invention, other grinding machines may be used in the method of this invention as long as the stated goals are achieved.

It should also be understood that although reference is made to poly(alpha-olefins) as a suitable drag reducer for hydrocarbon fluids that the invention is not limited to these particular polymers, but that other polymers known to reduce drag or friction in hydrocarbons, and other polymers in general may be used in the compositions and methods of this invention. It must also be understood that "drag reduction" includes, but is not necessarily limited to, any reduction, decrease, retardation, controlling, inhibiting, suppression, or other lowering of the effects of friction or drag of a fluid, liquid or hydrocarbon flowing through a pipeline and/or power requirements for transporting a hydrocarbon (or other liquid) through a pipeline. It is not necessary for drag or friction to be completely eliminated using the compositions and methods of this invention, nor for drag or friction to be reduced or lowered by any particular amount for the invention to be considered successful. Drag reduction is typically manifested as a decrease in the pressure difference across a section of pipeline.

The proportion of polymer in the polymer suspensions may range from a lower limit of about 10 wt. % to an upper limit of about 40 wt %; alternatively from a lower limit of about 17 wt. % to an upper limit of about 26 wt %, in non-limiting embodiments.

Hydrocarbon systems to which the DRA compositions herein may be applied include, but are not necessarily limited to, any flowing stream that has a notable hydrocarbon component. By "notable hydrocarbon component" is meant at least 10 volume percent hydrocarbon or oleaginous material. Hydrocarbon systems include, but are not necessarily limited to, multiphase flow lines (for example oil/water, water/oil, oil/water/gas) in oil and gas production and delivery systems, including gas transmission lines (e.g. gas/condensate, gas/condensate/water). It is expected that the invention could apply to any hydrocarbon fluid flowing in a pipeline or well, whether or not water or gas is present. It will be appreciated that by the term "hydrocarbon fluid", it is expected that oxygenated hydrocarbons such as alcohols, ethers, and the like are included within the definition. Thus, multiphase hydrocarbon-containing systems (e.g. oil/water, oil/gas, oil/water/gas), such as oil production flow lines and gas export lines are primary applications for this technology. Further, these hydrocarbon systems include, but are not necessarily limited to, crude oil streams, refined fuel streams, and the like.

It will also be appreciated that it is difficult, if not impossible, to specify in advance the amount or proportion of stable DRA polymer suspension that would be suitable and/or effective in any particular hydrocarbon stream since such amount or proportion depends on a wide variety of complex, interrelated factors including, but not necessarily limited to, the nature of the hydrocarbon stream as defined above, the temperature of the stream, the expected distance and/or time the DRA polymer is to be effective, the nature of the DRA polymer, the composition of the stable DRA polymer suspension, and the like. Such amounts and proportions are often best determined by empirical efforts, but nevertheless to give some idea of an expected dose or proportion, the amount of stable DRA polymer suspension may range from a lower limit of about 1 ppm to an upper limit of about 250 ppm and in another non-limiting embodiment may range from a lower limit of about 10 ppm to an upper limit of about 80 ppm.

The invention will now be further described with respect to specific examples that are provided only to further illustrate the compositions and methods herein and not limit them in any way.

EXAMPLE 1

A 7.3 g quantity of UNITHOX 520 (wax density 0.99 g/cc, HLB 4, m.p. 99° C.) was added to 50.1 g of tap water and mixed with a high shear mixer for 20 minutes. The resulting particle size of the dispersed wax was about 20 µm. About 50 g of a precipitated poly(alpha-olefin) polymer DRA material was added, and the combination was mixed for about 1 additional minute. The resulting polymer DRA suspension showed no signs of separation after 1 week and had low viscosity and a fluid character.

EXAMPLE 2

A 13.6 g quantity of MICHEM Lube 162 (wax density 1.0 g/cc, particle size 0.13 µm, m.p. 85° C.) was added to 34.3 g of tap water and homogenized. About 50 g of a precipitated poly(alpha-olefin) polymer DRA material was added, and the combination was mixed with a high shear mixer for about 1 minute. The resulting polymer DRA suspension was fluid and showed no signs of separation after 1 week at ambient temperature or when centrifuged. No separation was observed when held at 45° C. for several days.

EXAMPLE 3

A 300 g quantity of UNITHOX 520 was added to 5880 g of municipal water and mixed for 30 minutes, giving a 20-30 µm dispersion, and then diluted with 1470 g of ethylene glycol. The mixture was charged to a recirculated high-shear rotor-stator grinder, followed by the addition of 2330 g of granules of a bulk poly(alpha-olefin) DRA copolymer. This was ground to about 330 µm average particle size. A 10 g quantity of a polysaccharide was added along with 10 g biocide. The resulting DRA suspension was thick but fluid and stable against separation. Although it is difficult to prove, no size reduction is expected for the wax component during the grinding process. The purpose of the grinding is to reduce the 1 cm$^3$ granules to about 200-400 µm in diameter. The grinding is not intended to reduce the wax particles size.

EXAMPLE 4

A 600 g quantity of CALSAN 50 (50% calcium stearate plus proprietary surfactant(s), particle size <0.005 on 325 mesh (45 µm)) was added to 5880 g of municipal water and mixed for 10 minutes, and then diluted with 1470 g of ethylene glycol. The mixture was charged to a recirculated high-shear rotor-stator grinder, followed by the addition of 2330 g of granules of a bulk poly(alpha-olefin) DRA copolymer. This was ground to about 190 µm average particle size.

EXAMPLE 5

A 165 lb quantity of UNITHOX 520 was added to 220 gal of municipal water and mixed for 30 minutes, giving a 20-30 µm dispersion, and then diluted with 452 lb of propylene glycol. The mixture was charged to a recirculated high-shear rotor-stator grinder, followed by the addition of 808 lb of stabilized granules of a bulk poly(alpha-olefin) DRA copolymer. This was ground to about 253 µm average particle size. The resulting DRA suspension fluid and stable against separation for several days without agitation. The batch was injected into a crude oil pipeline and showed comparable performance to a commercial, alcohol-based formulation made from the same bulk polymer source.

Many modifications may be made in the compositions and processes of this invention without departing from the spirit and scope thereof that are defined only in the appended claims. For example, the exact nature of and proportions of polymer particles, carrier liquids, self-dispersing waxes, and optional additives, etc. may be different from those used here. Other alternative or additional processing techniques may be used or developed to enable the components to be homogeneously blended and work together well, yet still be within the scope of the invention. For instance, an alternative method of introducing the self-dispersing wax may be used from those exemplified and described herein. Additionally, proportions and types of the various components are expected to be optimized for each polymer particle type, particularly drag reducing polymers.

What is claimed is:

1. A polymer suspension comprising:
   a carrier liquid;
   a self-dispersing wax having a non-ionic surfactant component with an HLB of less than about 6, where the self-dispersing wax comprises a surfactant property provided from the group consisting of
      the self-dispersing wax itself, and
      a separate surfactant;
   where the suspended polymer particles have surfaces and the self-dispersing wax is not adhered to the surfaces; and
   suspended polymer particles, where the suspended polymer particles are poly(alpha-olefins) having a molecular weight effective to reduce drag in a flowing hydrocarbon stream.

2. The polymer suspension of claim 1 where the carrier liquid is a non-solvent for the suspended polymer particles and is selected from the group consisting of water, alcohols, fatty alcohols, glycols, diols, glycol ethers, glycol esters, and mixtures thereof.

3. The polymer suspension of claim 1 where the difference between the densities of the self-dispersing wax and the carrier liquid is within ±5%.

4. The polymer suspension of claim 1 where the self-dispersing wax disperses through the suspension spontaneously in the absence of applying added heat or grinding to the wax.

5. The polymer suspension of claim 1 where the self-dispersing wax comprises at least one alcohol ethoxylate comprising an alcohol moiety having at least 12 carbon atoms and from 1 to 10 ethoxy moieties.

6. The polymer suspension of claim 5 where the self-dispersing wax further comprises at least one additional compound selected from the group consisting of alcohols having at least 12 carbon atoms, saturated or unsaturated hydrocarbons having at least 12 carbon atoms and mixtures thereof.

7. The polymer suspension of claim 1 where the self-dispersing wax is present in a concentration of from about 0.01 to about 30 wt % of the polymer suspension.

8. The polymer suspension of claim 1 where the self-dispersing wax comprises a separate surfactant and the wax is selected from the group consisting of an alkali earth metal stearate, a polyolefin separate from the suspended polymer particles, naturally-occurring waxes, and combinations thereof.

9. The polymer suspension of claim 1 where the self-dispersing wax is substantially insoluble in water.

10. A hydrocarbon stream comprising the polymer suspension of claim 1.

11. A polymer suspension comprising:
   a carrier liquid;
   a self-dispersing wax having a non-ionic surfactant component with an HLB of less than about 6, where the self-dispersing wax spontaneously forms a stable suspension of solid wax particles in the carrier liquid, and where the self-dispersing wax comprises a surfactant property provided from the group consisting of
      the self-dispersing wax itself, and
      a separate surfactant;
   where the suspended polymer particles have surfaces and the self-dispersing wax is not adhered to the surfaces; and
   suspended polymer particles, where the suspended polymer particles are poly(alpha-olefins) having a molecular weight effective to reduce drag in a flowing hydrocarbon stream.

12. The polymer suspension of claim 11 where the carrier liquid is a non-solvent for the suspended polymer particles and is selected from the group consisting of water, alcohols, fatty alcohols, glycols, diols, glycol ethers, glycol esters, and mixtures thereof.

13. The polymer suspension of claim 11 where the difference between the densities of the self-dispersing wax and the carrier liquid is within ±5%.

14. The polymer suspension of claim 11 where the self-dispersing wax comprises at least one alcohol ethoxylate comprising an alcohol moiety having at least 12 carbon atoms and from 1 to 10 ethoxy moieties.

15. The polymer suspension of claim 11 where the self-dispersing wax is present in a concentration of from about 0.01 to about 30 wt % of the polymer suspension.

16. The polymer suspension of claim 11 where the self-dispersing wax comprises a separate surfactant and the wax is selected from the group consisting of an alkali earth metal stearate, a polyolefin separate from the suspended polymer particles, naturally-occurring waxes, and combinations thereof.

17. A hydrocarbon stream comprising the polymer suspension of claim 11.

* * * * *